May 3, 1960   S. C. WILLIS ET AL   2,934,770
POWER OPERATED CONVERTIBLE SOFA-BED

Filed Feb. 18, 1957   5 Sheets-Sheet 1

INVENTORS
SUMNER C. WILLIS
JOHN J. BARABAS
BY
Curtis, Morris & Safford
ATTORNEYS

INVENTORS
SUMNER C. WILLIS
JOHN J. BARABAS
BY
Curtis, Morris & Safford
ATTORNEYS

May 3, 1960 S. C. WILLIS ET AL 2,934,770
POWER OPERATED CONVERTIBLE SOFA-BED
Filed Feb. 18, 1957 5 Sheets-Sheet 4

INVENTORS
SUMNER C. WILLIS
JOHN J. BARABAS
BY
Curtis, Morris & Safford
ATTORNEYS May 3, 1960 S. C. WILLIS ET AL 2,934,770
POWER OPERATED CONVERTIBLE SOFA-BED
Filed Feb. 18, 1957 5 Sheets-Sheet 5

INVENTORS
SUMNER C. WILLIS
JOHN J. BARABAS
BY
Curtis, Morris & Safford
ATTORNEYS

United States Patent Office 2,934,770
Patented May 3, 1960

2,934,770

POWER OPERATED CONVERTIBLE SOFA-BED

Sumner C. Willis, White Plains, and John J. Barabas, East Meadow, N.Y., assignors to Castro Convertible Corporation, New Hyde Park, N.Y., a corporation of New York Application February 18, 1957, Serial No. 640,938

14 Claims. (Cl. 5—13)

This invention relates to a sofa-bed adapted for automatic opening or closing by means of an electrically operated motor and associated linkages.

An object of this invention is to provide a practical power operated convertible sofa-bed.

Another object is to provide such a sofa bed which operates quickly and easily and which is extremely reliable in operation.

A further object is to provide a sofa bed of this kind which is relatively simple and inexpensive to manufacture and which will operate smoothly and without difficulty to give a desired sequence of opening and closing.

These and other objects will in part be pointed out and in part be understood from the description given hereinafter.

Modern day convertible sofa beds of the kind described in U.S. patent application, Serial No. 419,173, filed March 29, 1954, now U.S. Patent 2,829,381, operate with amazing efficiency and ease. Beds of this kind can be opened and closed even by children. But, for even greater convenience and to completely eliminate any latent psychological feeling which some people may have that a convertible sofa-bed is difficult to operate, it is desirable to have a bed of this general kind which can be opened and closed automatically under its own power. Such a bed is, of course, particularly suited for people who wish to do no lifting at all and for use by people who may be relatively unfamiliar with the operation of a convertible bed as, for example, guests in a hotel who may never have used a convertible bed before.

Power operated convertible beds have previously been developed but, so far as is known, each of these was lacking in some respect so that it was never really commercially practical. Many of these beds because of limitations in mechanical design, were clumsy in appearance and noisy and frightening if not dangerous in their operation. Moreover many of these beds could not be operated in any way when their motor or source of power failed.

One recently attempted solution to certain of these shortcomings was in the use of a series of pump-operated hydraulic cylinders to open and close a slightly modified standard bed mechanism. In order to open and close the linkages of the prior bed mechanism smoothly in pre-determined sequence, a complex arrangement of at least four hydraulic cylinders were used. However, in addition to the fact that the numerous hydraulic cylinders and the pump and motor required for this prior bed were expensive, there was the not infrequent occurence of leaks in the hydraulic system resulting in fluid leaking out and spilling on the rug or floor. Therefore, in spite of the fact that this kind of prior bed usually operated relatively quietly and safely and in a desired sequence, a better and much more practical solution to the numerous past limitations with power beds still remained to be found.

The present invention seeks to completely avoid or overcome these limitations and does so by employing simplified mechanical linkages which not only are rugged and inexpensive but which because of the absence of complex parts or shapes, function smoothly, easily, and reliably and which can be concealed adequately to permit handsome styling of the complete sofa-bed.

In accordance with one specific embodiment of the present invention, a convertible bed mechanism, of the type generally like that disclosed in the aforesaid U.S. patent application, is equipped with unique elements and linkages for transmitting mechanical movement from a motor to open or close the bed. So effective is this arrangement that a motor small enough to fit in the palm of a man's hand is able to open the bed smoothly and gently in about 15 seconds. This is accomplished by converting rotation of the motor shaft into lateral movements of two push bars, each fastened to a respective side of the bed mechanism and movable in unison to push or pull it from a closed to an opened position and vice versa. These push bars are fastened to the bed mechanism and the mechanism itself is arranged so that as the bars are pushed forward the bed opens in a safe and non-frightening unfolding sequence. That is, the bed does not "tower up" as it unfolds. The motor driven parts of the bed are designed and mounted so that the bed operates with a very minimum of noise and smoothly and quickly and so that the bed is not ungainly in appearance. The arrangement of this new bed mechanism is such that it can easily be fitted in any standard style frame used with sofa-beds of the general type commercially sold today, for example as disclosed in the said co-pending application. Provision is made with this new mechanism so that when there is an electrical power failure, the bed can be opened or closed manually in the ordinary way. Thus, the electrically operated bed provided according to this invention is commercially practical not only because of its relatively low cost and good appearance but because of its safety and reliability and because it can be used without electric power when necessary.

A better understanding of the invention will best be gained from the following description considered in connection with the accompanying drawings in which.

Figure 1:
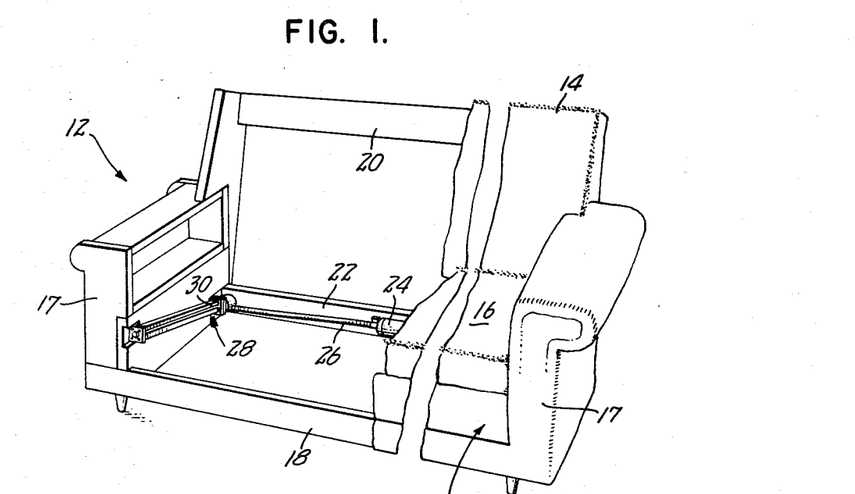
Figure 1 is a perspective view with parts broken away of a convertible bed according to the invention showing the bed in folded position and showing mounted on the frame of the bed the small electric motor which powers it.

Figure 1 shows a convertible bed 10 having a stationary frame, generally indicated at 12, to which is attached a back cushion 14. A removable seat cushion 16 is positioned upon and overlies the convertible bed mechanism which here is folded within the frame and which will shortly be described. The two side arms 17 of frame 12 are joined by a front rail 18 and the two back rails 20 and 22. Fastened near the center of a rail 22 is a small electric motor 24 which is connected at each of its ends by two flexible shafts 26 to the side tracks generally indicated at 28 (only the right shaft and track can be seen). Each of these tracks houses within it a worm shaft, shown later, upon which is engaged a feed nut 30 having an end which projects outward from the track. Each nut 30 is driven along its respective track 28 in unison with the other nut and acts to push or pull the rear end of one of the push bars 32 seen in Figure 2, for example.

Figure 2:
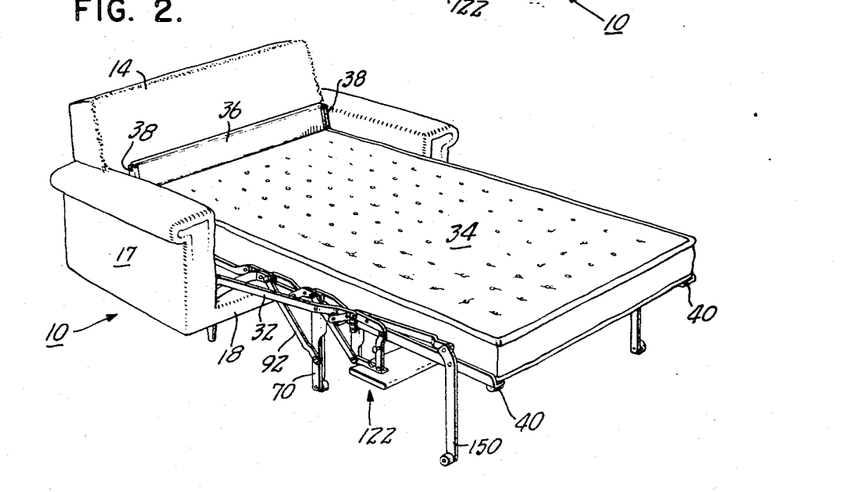
Figure 2 is a perspective view of the bed seen in Figure 1 but shown here in completely unfolded position.

As seen in Figure 2 the mechanism which was folded within frame 12 in Figure 1 is extended to a fully unfolded horizontal position in which it supports a mattress 34. Just in front of back cushion 14 is located the movable head board 36 which serves to keep the head of the person sleeping on the bed out of contact with the cushion 14. The side supporting arms 38 of this head board can, in conjunction with a set of rollers 40 on the front corners of the bed, function in the way described in the aforesaid co-pending application to compress the mattress folded double upon itself when the bed is in the fully folded position of Figure 1.

Figure 3:
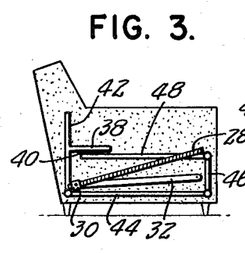
Figures 3 through 9 are schematic side views showing the bed of Figure 1 at successive stages moving from fully closed position to fully opened position.

As seen in Figure 3, which is a schematic side view of bed 10 in fully folded position, the bed mechanism consists of an inner section 42 which is here in generally vertical position, an intermediate section 44 which is connected to the lower end of section 42 and lies generally horizontal, a vertical connecting section 46 pivoted to the front end of section 44, and an end section 48 parallel to intermediate section 44. Sections 42 and 44 are suspended generally in the way described in the aforesaid co-pending application from the stationary frame of the sofa. Track 28 is fixed thereto as will be described. Connected between the feed nut 30, which runs along track 28, and a point adjacent the front end of section 44 is a push bar 32, seen more distinctly in Figure 4. This latter figure indicates the relative position of this push bar, the sections 42, 44, 46 and 48 and the feed nut 30 after the nut has moved somewhat forward of its rearmost position seen in Figure 3.

Figure 4:
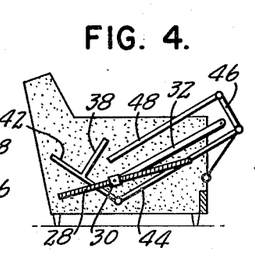
Figure 5:
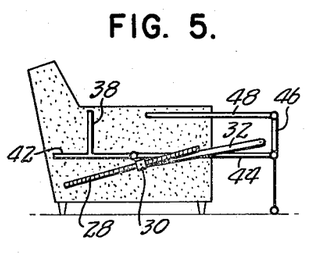
Figure 6:
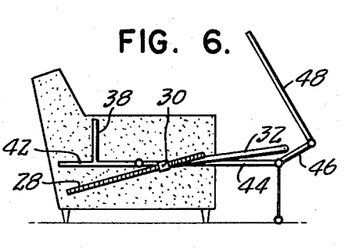
Figure 7:
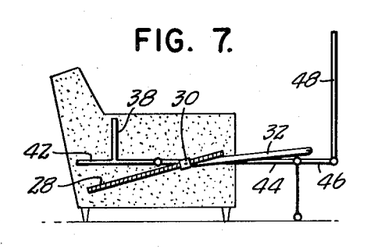
Figure 8:
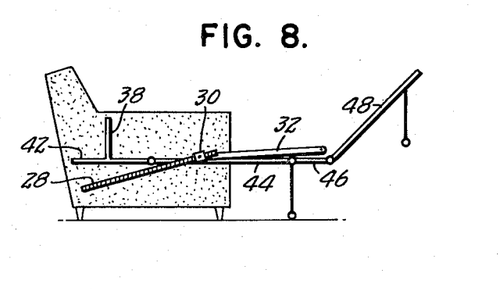

Figure 5 shows the position of these elements advanced somewhat farther beyond their position in Figure 4. As seen in Figure 5, sections 42 and 44 extend horizontally in a straight line and the right-angle joints between sections 44 and 46 and sections 46 and 48 have not yet been broken. Additional forward movement of feed nut 30 causes the joint between sections 44 and 46 to unfold first, as shown in Figure 6. The angular inclination at various points along its travel and the action of the linkages to which the front end of push bar 32 is connected are especially designed so that the lower right-angle joint i.e. the joint between sections 44 and 46, will be the first to break and will be completely or nearly completely unfolded as shown in Figure 7 before the right-angle joint between sections 46 and 48 breaks. Further forward movement of feed nut 30 acting on push bar 32 causes section 48 to unfold with respect to section 46 as shown in Figure 8 and to reach the completely unfolded position of Figure 9 wherein the sections 42, 44, 46 and 48 extend horizontally in a straight line.

Figure 9:
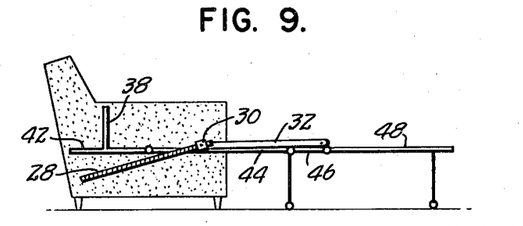
Figure 10:
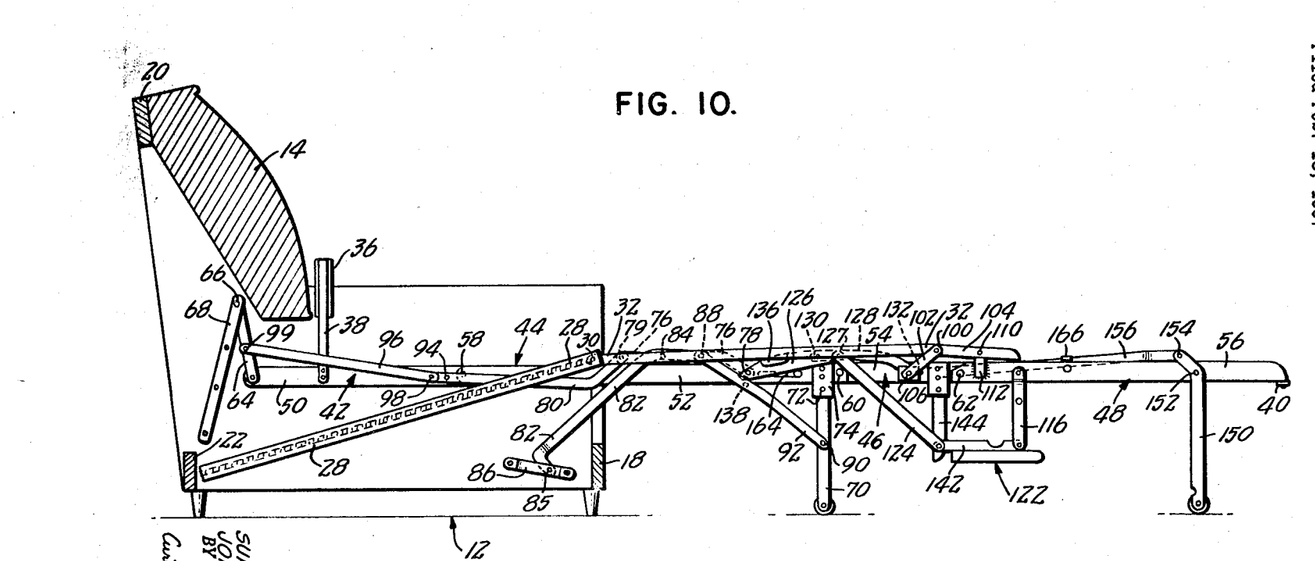
Figure 10 is a detailed view, slightly enlarged, of the bed in fully extended position.

Figure 10 shows in a right side view in more detail the bed sections 42, 44, 46 and 48 occupying their horizontal and extended position previously indicated in Figure 9. Section 42 includes two side rails 50, one on each side of the bed, which are joined together by spacer bars, not shown, and between which a mattress supporting spring, also not shown, is stretched. Sections 44, 46 and 48 similarly include the side rails 52, 54 and 56 respectively. Rails 50 and 52 are pivoted to each other at 58; rails 52, 54 at 60; and rails 54, 56 at 62. The rear end of rail 50 is pivoted to the swinging link 64 which in turn is pivoted at 66 to the bar 68 fixed to the stationary frame of the bed.

The front end of rail 52 is supported above the floor by the leg 70 which is pivoted at 72 to the plate 74 fixed to rail 52. Near the middle of rail 52 lies the link 76 which at its forward end is pivoted at 78 to the inside of rail 52 and its rear end is pivoted at 79 to another link 80. Lying parallel to link 76 is the upper portion of the long curved link 82 which is pivoted to link 76 at 84 and is hinged at its lower end at 85 to the bracket 86 which is fixed to the frame of the bed. Pivoted between the top end of link 82 at 88 and the center of leg 70 at 90 is the link 92 which serves to pull the leg back and up against rail 52 when the bed is folded. The junction or pivot 58 between rails 50 and 52 is prevented from sagging by the link 80 which is pivoted near its rear end to rail 50 at 94 and is hinged to the link 96 at 98. This last link at its rear end is pivoted at 99 to swinging link 64.

Figure 16:
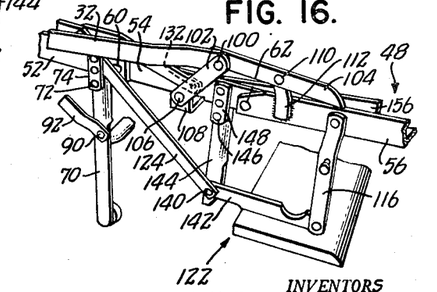

The front end of push bar 32, seen also in the same relative position in Figure 16, is pivoted at 100 to the two links 102 and 104. As seen best in Figure 16, link 102 is pivoted at 106 to the free end of the angle bracket 108 whose inner end is welded to rail 54. Link 104 near its middle is pivoted at 110 to the bracket 112 which is welded to rail 56.

Figure 11:
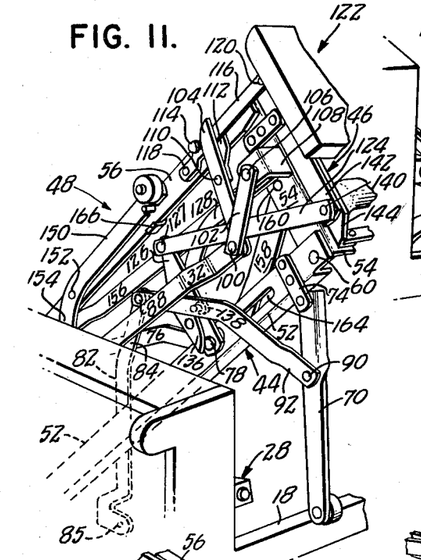
Figures 11 through 16 are detailed views of the linkage at one side of the bed taken at successive stages in the unfolding of the bed.

Referring to Figure 11 which shows the articulated bed sections 42, 44, 46 and 48 occupying approximately their relative positions indicated schematically in Figure 4, push bar 32, whose front end is seen, lies inclined roughly at a 45° angle relative to the floor. Links 102 and 104 which are pivoted to the front end of push bar 32 tend to be rotated counterclockwise about their respective pivot points 100 and 110 by a forward and upward thrust of push bar 32. Counterclockwise rotation of these links as shown in Figure 11 is not possible however because pivot 110 cannot swing down relative to pivot 106. To prevent end section 48 from being manually unfolded relative to connecting section 46 in the positions of Figures 11, 12 and 13, the top end of link 104 abuts against the stub or pin 114 which is carried on the link 116. This latter link is pivoted between point 118 on rail 56 and the point 120 near the top of the frontboard structure generally indicated at 122.

Forward movement of push bar 32 from the position Figure 11 does not tend to break or unfold the lower right angle joint at pivot 60 where rails 52 and 54 are joined together because the resultant force vector acting on pivot 100 passes through or just slightly above pivot 60. There is therefore not yet enough force pushing forward perpendicular relative to rail 54 to unfold it relative to rail 52. However to positively lock these rails perpendicular until they reach the position of Figure 12, there is provided a link and cam arrangement acting between rail 54 and rail 52. This arrangement which includes the link 124, the swinging arm 126 to which the rear end of link 124 is pivoted at 127, see also Figures 12 and 13, and the link 128 pivoted to arm 126 at 130 and to rail 54 at 132. The lower end of swinging arm 126 is pivoted to rail 52 at point 78 seen best in Figures 10 and 13. Forward swinging of arm 126 from its position shown in Figure 11 is temporarily prevented by the cam plate 136 affixed to it near its lower end and which bears against a pin or stub 138 carried on the inside of link 92. After this pin, because of the motion of link 92, moves down along the curved surface of cam 136 to the position shown in Figure 12, arm 126 is permitted to move forward under the force of push bar 32 on link 102 and the pull of link 128. In this way the angle between rails 52 and 54 at pivot 60 is unfolded from the right angle shown in Figure 11 through the intermediate stages shown in Figures 12 and 13, to the 180° position shown in Figure 14. During this unfolding at pivot 60, the joint at upper pivot 62 between rails 54 and 56 is maintained as a right angle as previously explained.

Figure 13:
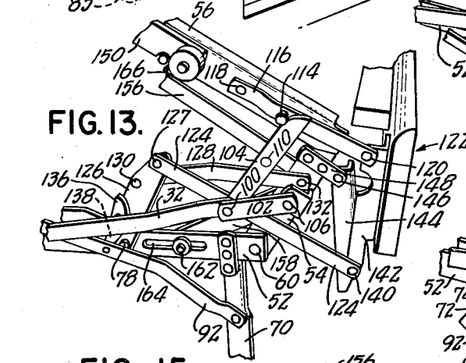
Figure 14:
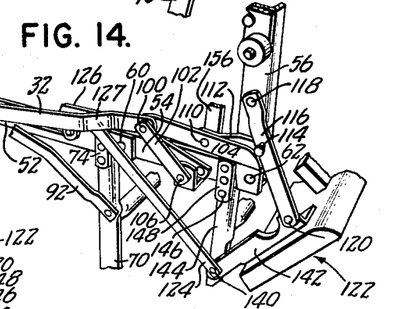
Figure 15:
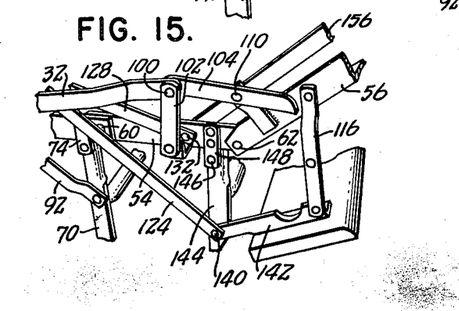

As arm 126 swings farther forward from the position of Figure 13 pushing against rail 54 through link 128, the link 124 is also pushed forward. This link at its forward end is pivoted at 140 to the side bracket 142 of the frontboard 122. Link 116 is pivoted to the upper end of this bracket at point 120 and thus the bracket is supported by a modified parallelogram arrangement. Also pivoted to the lower end of frontboard bracket 142 at 140 is the swinging link 144, whose upper end is pivoted at 146 to the tab 148 fixed to rail 54. As push bar 32 moves forward beyond its position in Figure 14, link 116 swings pin 114 free of the outer end of link 104 thus unlocking the joint at pivot point 62. Thereafter the angle here commences to straighten out as shown in Figure 15 to the 180° position shown in Figure 16.

Referring to Figure 10, the front end of end section 48 is supported above the floor by the leg 150 which is pivoted near its top end to rail 56 at 152. The top end of leg 150 is pivoted at 154 to the link 156 whose rear end, as seen also in Figure 13, for example, is pivoted to rail 54 at point 132 along with link 128.

Figure 12:
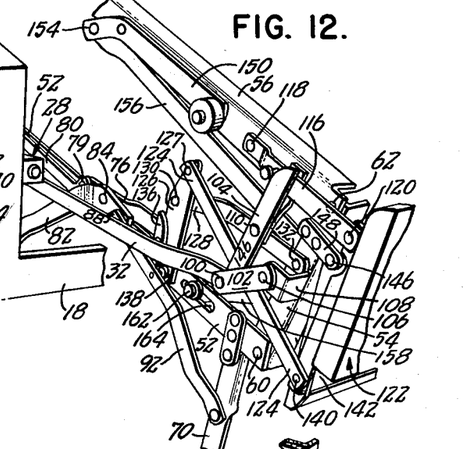

When push bar 32 is pulled backward from the position shown in Figure 16, the force it exerts on pivot point 100 tends to push rail 54 downward and to rotate rail 56 upward about pivot 62. This helps ensure that the joint at pivot 62 will break and close to a right angle before the joint at pivot 60 breaks. When the bed sections reach the position shown in Figure 12, cam pin 138 carried on link 92 begins again to act on cam plate 136 and this in conjunction with the pull on link 102 brings the joint at pivot 60 finally to a right angle as shown in Figure 11. The joint is held from closing further by the link 158 pivoted at 160 to rail 54 and, as seen in Figure 12, for example, slidable on pin 162 in the slot 164 in rail 52. Further inward movement of push bar 32 draws bed sections 44, 46 and 48, folded as shown in Figure 11, back and down. During this movement the jacknife action of links 76 and 82 pulls leg 70 back and over frame rail 18 and against the underside of rail 52 when the bed is fully folded. When end section 48 is folded back over intermediate section 44, as in Figure 11, it is held from collapsing and positioned generally parallel to section 44 with the mattress compressed between these sections by links 104, 102 acting between rails 56 and 54, by link 158 acting between rails 54 and 52, and by the abutment of the top of swinging arm 126 against the stop 166 on rail 56.

Figure 17:
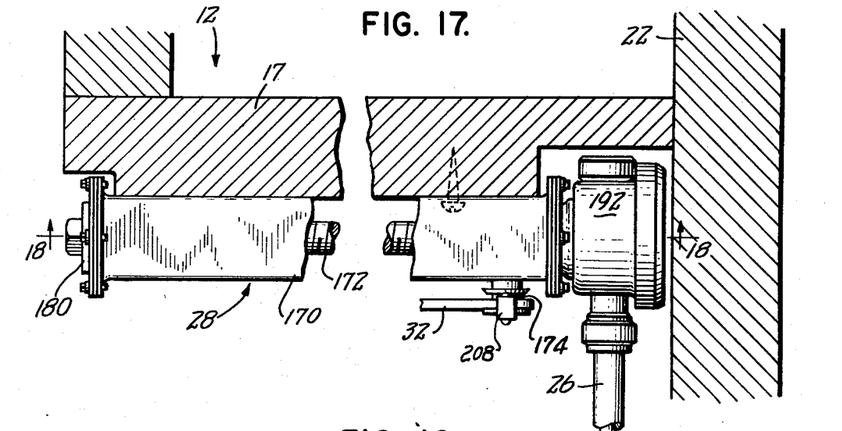
Figure 17 is a plan of a motor driven element fastened on one side of the bed frame and adapted to drive one of the push bars.
Figure 18:
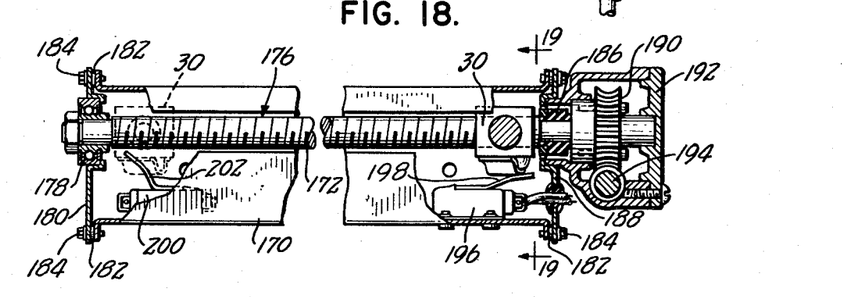
Figure 18 is a cross section view taken along lines 18—18 in Figure 17.
Figure 19:
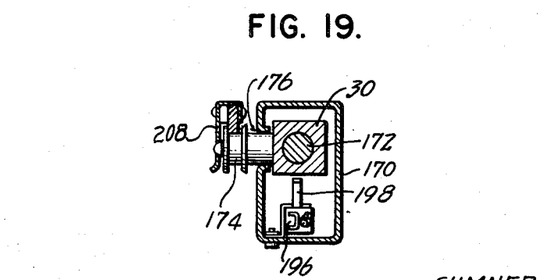
Figure 19 is a cross section view taken along line 19—19 in Figure 18.

The structural details of each track 28 which propels feed nut 30, to which in turn is pivoted the lower end of push bar 32, are given in Figures 17, 18 and 19. This track includes a housing 170, which is fixed to a side of frame 12, as indicated previously. Within this housing is rotatably mounted a worm shaft 172 whose external threads mate with the internal threads of feed nut 30. This nut has a stub extension 174 seen best in Figure 19 on which is removably mounted the rear end of bar 32, the stub 174 extending through the slot-like opening 176 along the side of housing 170. This opening runs the length of housing 170 and permits nut 30 to move along shaft 172 from one end to the other. Referring to Figure 18, the front or left end of shaft 172 is mounted in a bearing 178 which is carried on an end plate 180. This plate is resiliently mounted on housing 170 by the rubber mounting blocks 182 and the bolts 184. The rear or right end of shaft 172 is carried in a bearing 186 which is mounted on an end plate 188 resiliently supported on the end of housing 170 in the same way as plate 180.

The rear end of worm shaft 172 is fixed to a worm wheel 190 mounted within the housing 192, seen also in Figure 17, and driven in turn by the tangentially mounted worm shaft 194. This shaft is rotated clockwise or counterclockwise in accordance with the direction of rotation of motor 24, seen only in Figure 1. Shaft 194 is connected to this motor by a respective one of the flexible shafts or cables 26, seen also in Figure 17.

Feed nut 30, in the position of Figures 17 and 18 stands at its rearmost limit within housing 170. In this position, the microswitch 196 positioned directly beneath nut 30 is held open by switch arm 198 which is depressed by nut 30. This switch is spring biased to close when arm 198 is released. A similar limit switch 200 and switch arm 202 are mounted in the front end of housing 170.

Figure 20:
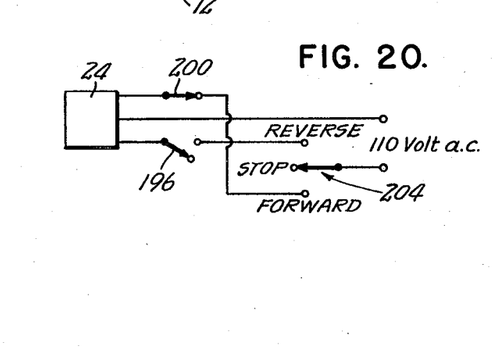
Figure 20 is a diagram of the electric circuit and motor used with the bed.

These switches are in series with the main power circuit supplying motor 24 as shown schematically in Figure 20. This circuit also includes the manually operable main power switch 204 having "stop," "forward" and "reverse" positions. Assuming feed nut 30 positioned as shown in Figure 18, when switch 204 is moved to "forward," motor 24 is energized and nut 30 can travel along worm shaft 172 to its forward end. This will open the bed to the position shown in Figure 10. When nut 30 reaches its forward limit of travel, it will open switch 200 and prevent further forward rotation of motor 24. Switch 196, however, will now be closed and the bed can be folded again by moving the main switch 204 to reverse position. When nut 30 again reaches the position of Figure 18, switch 196 will open and the switches 200 and 196 will stand in their positions of Figure 20.

It will be appreciated that the length of travel of feed nut 30 along worm shaft 172, and the lengths and positions of track 28, push bar 32, pivot point 100, and links 102 and 104 require careful selection and adjustment to ensure that the bed opens and closes in the proper way as indicated, for example, in Figures 3 through 9. When the bed is closed, and feed nut 30 first starts to move forward from its position of Figure 3, push bar is almost horizontal and lies approximately parallel relative to intermediate bed section 44. As indicated in Figures 4 and 11, the front end of push bar 32 quickly swings up with the pivoting of link 82 and the swinging forward of the bed sections. However, the forward component of thrust of push bar 32 remains enough to move the bed sections to the position indicated in Figures 5 and 12 in which sections 42 and 44 are extended horizontally and wherein push bar 32 lies near enough to horizontal so that its upward component of thrust can no longer lift the front end of bed section 44. Thereafter, and as seen in Figure 12, pivot point 100 at the forward end of push bar 32 continues to move forward thereby extending rail 54 in a straight line beyond rail 52 as seen in Figure 14. Thereafter pivot 100 begins to precess clockwise around pivot 106 on the lower end of link 102. This finally unfolds the end bed section 48 so that all the sections are horizontal and occupy the position of Figure 16.

During the clockwise swinging of pivot 100 around pivot 106, the upward component of thrust of push bar 32 on pivot 100 is not enough to lift leg 70 off of the floor. Conversely, when push bar 32 is drawn backward from the position of Figure 16, its downward component of thrust holds leg 70 on the floor until the position of Figure 12 is reached. This ensures that, when push bar 32 is drawn back from the position of Figure 14 to that of Figure 13, the lower 180° joint at pivot 60 between sections 46 and 44 in Figure 14 breaks before leg 70 lifts from the floor. It will be appreciated that by virtue of the relative lengths and placement of the pivots of links 102 and 104 and push bar 32, the sequence of unfolding or folding of the bed described above will be obtained without the additional locking action of pin 114 and cam plate 136 in conjunction with pin 138. These members 114, 136 and 138 could therefore be omitted but are provided as an aid in compressing the mattress between sections 44 and 48, and so that the bed can be easily operated manually without push bars 32.

Figure 21:
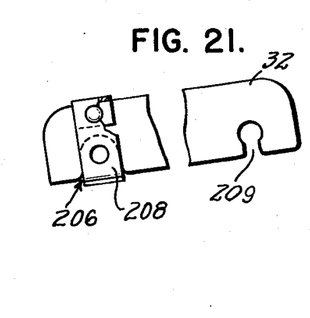
Figure 21 is a detailed view of the two ends of a link or push bar in the bed mechanism.

By removing the two push bars 32 from their respective feed nuts 30 and from pivot points 100, bed 10 can be opened or closed by hand in the usual way. To accomplish the removal of these bars 32, their ends as shown in Figure 21 are made so that they can be slipped on or off of their respective points of attachment. The left or rear end of each bar 32 is provided with a parallel-throat slot 206 and a cantilever spring arm 208 which can snap over the head of stub 174 of feed nut 30 in the way shown in Figure 19, and hold stub 174 within the throat of slot 206.

Figure 22:
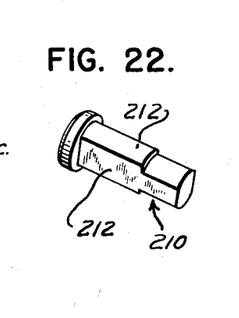
Figure 22 is a perspective view of a pivot pin of the bed linkage which engages with one end of the bar seen in Figure 21.

The right or forward end of each bar 32 is provided with a restricted-throat slot 209. The throat of this slot will slip over a pin 210, seen in Figure 22, having two flat portions 212 and which holds the links 102 and 104 permanently pivoted together at point 100. Pin 210 is fixed to link 104 so that the planes of flat portions 212 lie generally at an acute angle of approximately 30° to the longitudinal axis of link 104 and almost parallel to the longitudinal axis of link 102 as shown in Figure 11. Accordingly each push bar 32 must be first disengaged from feed nut 30 and then rotated upward until it forms an acute angle of approximately 70° with link 104 (which angle it never assumes in the normal operating cycle) before it can be disengaged from pin 210 at pivot 100.

In a sofa-bed embodying features of the invention which has been built and successfully tested the shapes and positions of the various elements in the bed mechanism are substantially exactly like those shown in Figures 11 through 16. Actual dimensions in inches, given here by way of illustration and not as implying that the invention is limited to them are as follows:

|  | Inches |
|---|---|
| Length between end pivot holes of rail 50 | 15¾ |
| Length between end pivot holes of rail 52 | 28½ |
| Length between end pivot holes of rail 54 | 7 |
| Length between end pivot holes of rail 56 | 24 |
| Length between end pivot holes of link 64 | 5⅞ |
| Length between end pivot holes of link 96 | 14 |
| Length between end pivot holes of link 80 | 15¼ |
| Length between end pivot holes of link 76 | 9½ |
| Length of bar 32 | 26 |
| Distance from pivots 94 to 98 | 1⅝ |
| Distance from pivots 58 to 94 | 1¼ |
| Distance from pivots 79 to 84 | 3 |
| Distance from pivots 84 to 88 | 2 |
| Distance from pivots 78 to 84 | 6⅝ |
| Distance from pivots 84 to 85 | 12 |
| Distance from pivots 72 to 90 | 3 |
| Distance from pivots 88 to 90 | 11½ |
| Distance from pivots 78 to 127 | 5½ |
| Distance from pivots 78 to 60 | 7 |
| Distance from pivots 60 to 62 | 7 |
| Distance from pivots 62 to 132 | 2½ |
| Distance from pivots 60 to 160 | 3½ |
| Distance from pivots 160 to 132 | 1 |
| Distance from pivots 127 to 140 | 10⅜ |
| Distance from pivots 78 to 127 | 5½ |
| Distance from pivots 127 to 130 | 2⅛ |
| Distance from pivots 78 to 130 | 3⅝ |
| Distance from pivots 62 to 118 | 4½ |
| Distance from pivots 118 to 120 | 6 |
| Distance from pivots 110 to 118 | 3½ |
| Distance from pivots 62 to 110 | 2¾ |
| Distance from pivots 140 to 146 | 4⅝ |
| Distance from pivots 120 to 140 | 5⅞ |
| Distance from pivots 100 to 106 | 2¾ |
| Distance from pivots 100 to 110 | 3 | when the bed is closed, pivot 94 lies approximately opposite nut 30 in its rear-most position; pin 138 on link 92 lies ¾" above a straight line between pivots 88 and 90, pin 138 is 4½" from pivot 88 and lies approximately opposite pivot 78 when the bed is unfolded; pivots 60, 160, 132 and 62 lie along a generally straight line on rail 54; pin 114 on link 116 lies 2⅝" from pivot 118; bracket 108 holds pivot 106 1¼" out from the side of rail 54 opposite a point approximately midway between pivots 132 and 160; pivot 146 lies 1" in front of the center line between pivots 60 and 62; the distance from pivots 106 to 110 in Figure 11 is 1¾" while in Figure 16 it is 5⅜" with link 104 lying generally parallel to rail 56; the total length of travel of nut 30 along track 28 is 30¾"; at its forward-most limit nut 30 is 11½" above the floor while at its rear-most limit it is 4¾" above the floor; track 28 is inclined upward at approximately 12° to 15°; pivot 85 is 5" above the floor and 2" behind a vertical line through the forward-most limit of nut 30; pivot 66 is 16½" above the floor; and the centerline of pivots 58, 60 and 62 as seen in Figure 10 is 11¼" above the floor.

The above description and the drawings are given in illustration and not in limitation of the invention. Various changes or modifications in the particular embodiment illustrated may occur to those skilled in the art and these can be made without departing from the spirit or scope of the invention as set forth.

We claim:

1. A power operated convertible sofa-bed comprising, a stationary frame, an inner, an intermediate, a connecting and an end section serially pivoted together and adapted to extend out of said frame horizontally in a straight line when unfolded and when folded to nest within said frame with said end section folded back over said intermediate section lying parallel thereto and generally horizontal and with said inner and connecting sections generally vertical, said inner and intermediate sections being swingably suspended in said frame, two motion guide tracks, one mounted on each side of said frame in a forwardly and upwardly inclined position, a feed nut mounted in each track, a rotatable worm shaft mounted in each track for propelling each nut therealong, motor means for rotating each shaft in unison with the other, two push bars, each one pivoted at its rear end to a respective one of said nuts, two pairs of links, one pair on each side of said sections, a first link of a pair being pivoted at its front end near the middle of said connecting section, the second link being pivoted to a portion of said end section near its end adjacent said connecting section, the rear ends of said links and the front end of said push bar being pivoted together.

2. The combination of elements as in claim 1 wherein said motor means comprises a single motor connected to drive each worm shaft in unison, said motor being reversible at will.

3. The combination of elements as in claim 1 wherein said inner and intermediate sections at each side are suspended from said frame by a rear link pivoted at one end to the rear of said inner section and at its other end to said frame, and by a forward link pivoted near its forward end to a portion of said intermediate section and at its lower end to said frame, and wherein when said sections are extended horizontally said push bar lies slightly above said intermediate and connecting sections approximately parallel thereto.

4. The combination of elements as in claim 1 in further combination with first lock means acting on said second link to prevent said end section from being unfolded relative to said connecting section until said inner, intermediate and connecting sections have been extended substantially horizontally, and second lock means for preventing unfolding of said intermediate and connecting sections until said inner and intermediate sections are extended substantially horizontally.

5. The combination of elements as in claim 4 wherein said first lock means includes a movable pin pivoted to said end section to abut against a free end of said second link and movable upon unfolding of said intermediate and connecting sections to free the end of said second link.

6. The combination of elements as in claim 4 wherein said second lock means includes a cam arm linked to said intermediate and connecting sections, and a cam follower engageable with said arm and movable out of engagement with said cam arm to permit said intermediate and connecting sections to unfold after said inner and intermediate sections are generally horizontal and in line.

7. In a convertible sofa-bed of the character described, a stationary frame, first, second, third and fourth bed sections serially pivoted together and adapted when open to lie in a straight line horizontally above the floor a given distance with said first section above said frame and said other sections extending outward therefrom and adapted when closed to lie folded within said frame with said first and third sections generally vertical and at right angles to said second and fourth sections, and with said fourth section folded back over said second section and lying approximately at said given distance from said floor, links swingably suspending said sections from said frame, and power operated means for opening and closing said sections comprising on each side of said sections an upwardly inclined elongated track fixed to said frame roughly parallel to a diagonal of said sections when folded, a push bar pivoted at its front end to said sections, and power operated means to move the rear end of said pushbar along said track to open or close said bed.

8. The combination of elements as in claim 7 wherein said push bar at its front end is pivoted to a first link which in turn is pivoted to said third section, and said bar is also pivoted to a second link which in turn is pivoted to said fourth section, said bar when said sections are closed lying generally parallel and slightly above said second section, said first link lying at roughly 45° relative to said third section, and said second link lying roughly perpendicular to said fourth section.

9. The combination of elements as in claim 8 in further combination with first means to keep said third and fourth sections perpendicular until said second and third sections are approximately horizontal, and second means to keep said second and third sections perpendicular to each other until said first and second sections are generally horizontal.

10. The combination of elements as in claim 8 wherein said track is inclined at roughly 12° to 15°, and wherein when said sections are open said push bar lies slightly above said second and third sections and said first link lies at roughly 45° forward and upward of its pivot on said third section, and said second link lies roughly horizontal.

12. A power operated convertible sofa-bed comprising, a stationary frame, three articulated bed-sections each pivoted to another and adapted to lie in folded position with a first section generally horizontal, a second section generally vertical and pivoted to the forward end of said first section and extending upward therefrom, and a third section generally horizontal and extending back over the first and being pivoted to the second at its top, said first section being swingably hung in said frame, said sections being adapted to extend horizontally in line from said frame when unfolded, power operated mechanical motion transmitting means for opening and closing said sections including a push bar whose rear end rides upon a track fixed to said frame and whose front end is pivoted to a first link in turn pivoted to said third section and also pivoted to a second link in turn pivoted to said second section, said first and second links when said sections are folded being positioned with said first link extending downward and said second link extending downward and backward, the forward end of said push bar then lying above its rear end, whereby said first, second and third sections are held at right angles during opening of the bed until said first section is generally horizontal, and said second and third sections are held generally at right angles to each other until said second section is generally horizontal.

13. A power operated convertible sofa-bed comprising, a stationary frame, a first, a second, and a third section serially pivoted together and adapted to extend out of said frame horizontally in a straight line when unfolded and when folded to nest within said frame with said third section folded back over said first section lying parallel thereto and generally horizontal and with said second section generally vertical, said first section being swingably suspended in said frame, two motion guide tracks, one mounted on each side of said frame in a forwardly and upwardly inclined position, a feed nut mounted in each track, a rotatable worm shaft mounted in each track for propelling each nut therealong, motor means for rotating each shaft in unison with the other, two push bars, each one pivoted at its rear end to a respective one of said nuts, two pairs of links, one pair on each side of said sections, a first link of a pair being pivoted at its front end near the middle of said second section, the second link being pivoted to a portion of said third section near its end adjacent said second section, the rear ends of said links and the front end of said push bar being pivoted together.

14. A power-operated convertible sofa-bed comprising, a stationary frame, three articulated bed-sections each pivoted to another and adapted to lie in folded position with a first section generally horizontal, a second section generally vertical and pivoted to the forward end of said first section and extending upward therefrom, and a third section generally horizontal and extending back over the first and being pivoted to the second at its top, said first section being swingably hung in said frame, said sections being adapted to extend horizontally in line from said frame when unfolded, power operated mechanical motion-transmitting means for opening and closing said sections including on each side of said frame a motion guide track, a carriage mounted on said track for movement therealong, a motion transmitting bar whose rear end is pivoted to said carriage and whose front end is pivoted to a first link in turn pivoted to said third section and also pivoted to a second link in turn pivoted to said second section, said first and second links when said sections are folded being positioned with said first link extending downward and said second link extending downward and backward, the forward end of said bar then lying above its rear end, whereby said first, second and third sections are held at right angles during opening of the bed until said first section is generally horizontal, and said second and third sections are held generally at right angles to each other until said second section is generally horizontal.

References Cited in the file of this patent

UNITED STATES PATENTS

| | | |
|---|---|---|
| 604,498 | Nilson | May 24, 1898 |
| 1,397,773 | Muir | Nov. 22, 1921 |
| 1,978,902 | Jackson | Oct. 30, 1934 |
| 2,322,512 | Fox, et al. | June 22, 1943 |
| 2,445,158 | Sparhawk | July 13, 1948 |
| 2,785,415 | Petersen | Mar. 19, 1957 |
| 2,802,219 | Travis | Aug. 13, 1957 |
| 2,807,174 | Helsel | Sept. 24, 1957 |

FOREIGN PATENTS

| | | |
|---|---|---|
| 1,136,345 | France | Dec. 29, 1956 |

UNITED STATES PATENT OFFICE

CERTIFICATE OF CORRECTION

Patent No. 2,934,770                                May 3, 1960

Sumner C. Willis et al.

It is hereby certified that error appears in the printed specification of the above numbered patent requiring correction and that the said Letters Patent should read as corrected below.

Column 9, line 46, after "horizontal." insert the following claim:

11. The combination of elements as in Claim 9 wherein said first means to keep said third and fourth sections perpendicular includes a frontboard linkage and an abutment carried thereon, said abutment being adapted to bear against said second link until said second and third sections lie approximately along a straight line.

Signed and sealed this 11th day of October 1960

(SEAL)
Attest:

KARL H. AXLINE
Attesting Officer

ROBERT C. WATSON
Commissioner of Patents